US012585024B2

(12) United States Patent
Da Silveira Rodrigues et al.

(10) Patent No.: US 12,585,024 B2
(45) Date of Patent: Mar. 24, 2026

(54) IONOSPHERIC SCINTILLATION AND TOTAL ELECTRON CONTENT MONITORING SYSTEM

(71) Applicant: Board of Regents, The University of Texas System, Austin, TX (US)

(72) Inventors: Fabiano Da Silveira Rodrigues, Richardson, TX (US); Josemaria Gomez Socola, Dallas, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 265 days.

(21) Appl. No.: 18/330,721

(22) Filed: Aug. 29, 2023

(65) Prior Publication Data

US 2023/0417925 A1 Dec. 28, 2023

Related U.S. Application Data

(60) Provisional application No. 63/349,656, filed on Nov. 24, 2025.

(51) Int. Cl.
| | |
|---|---|
| *G01S 19/07* | (2010.01) |
| *G01S 19/14* | (2010.01) |
| *G01S 19/24* | (2010.01) |
| *G01S 19/41* | (2010.01) |

(52) U.S. Cl.
CPC ............ *G01S 19/072* (2019.08); *G01S 19/14* (2013.01); *G01S 19/24* (2013.01); *G01S 19/41* (2013.01)

(58) Field of Classification Search
CPC ........ G01S 19/072; G01S 19/14; G01S 19/24; G01S 19/41
USPC ...................................................... 342/357.44
See application file for complete search history.

(56) References Cited

U.S. PATENT DOCUMENTS

| | | | | |
|---|---|---|---|---|
| 12,020,584 B2 * | 6/2024 | Wu | ........................... | G08G 5/76 |
| 12,313,428 B2 * | 5/2025 | Hayashi | ................. | G01S 19/31 |

FOREIGN PATENT DOCUMENTS

| | | | | | |
|---|---|---|---|---|---|
| CN | 112526618 A | * | 3/2021 | ............. | G01S 19/33 |

* cited by examiner

*Primary Examiner* — Harry K Liu
(74) *Attorney, Agent, or Firm* — Thomas I Horstemeyer, LLP

(57) ABSTRACT

The present disclosure presents systems method for remote sensing of the ionosphere. One such method comprises providing a single-board computer communicatively connected to a global navigation satellite systems (GNSS) receiver which is preconfigured to determine global positioning system coordinates by communicating with a set of GNSS satellites, reconfiguring the function of the single-board computer and GNSS receiver to acquire a set of GNSS signal parameters; and determining the set of physical properties of an ionosphere from the set of GNSS signal parameters. Other methods and systems are also provided.

17 Claims, 13 Drawing Sheets

100

101       104                    102              105              103

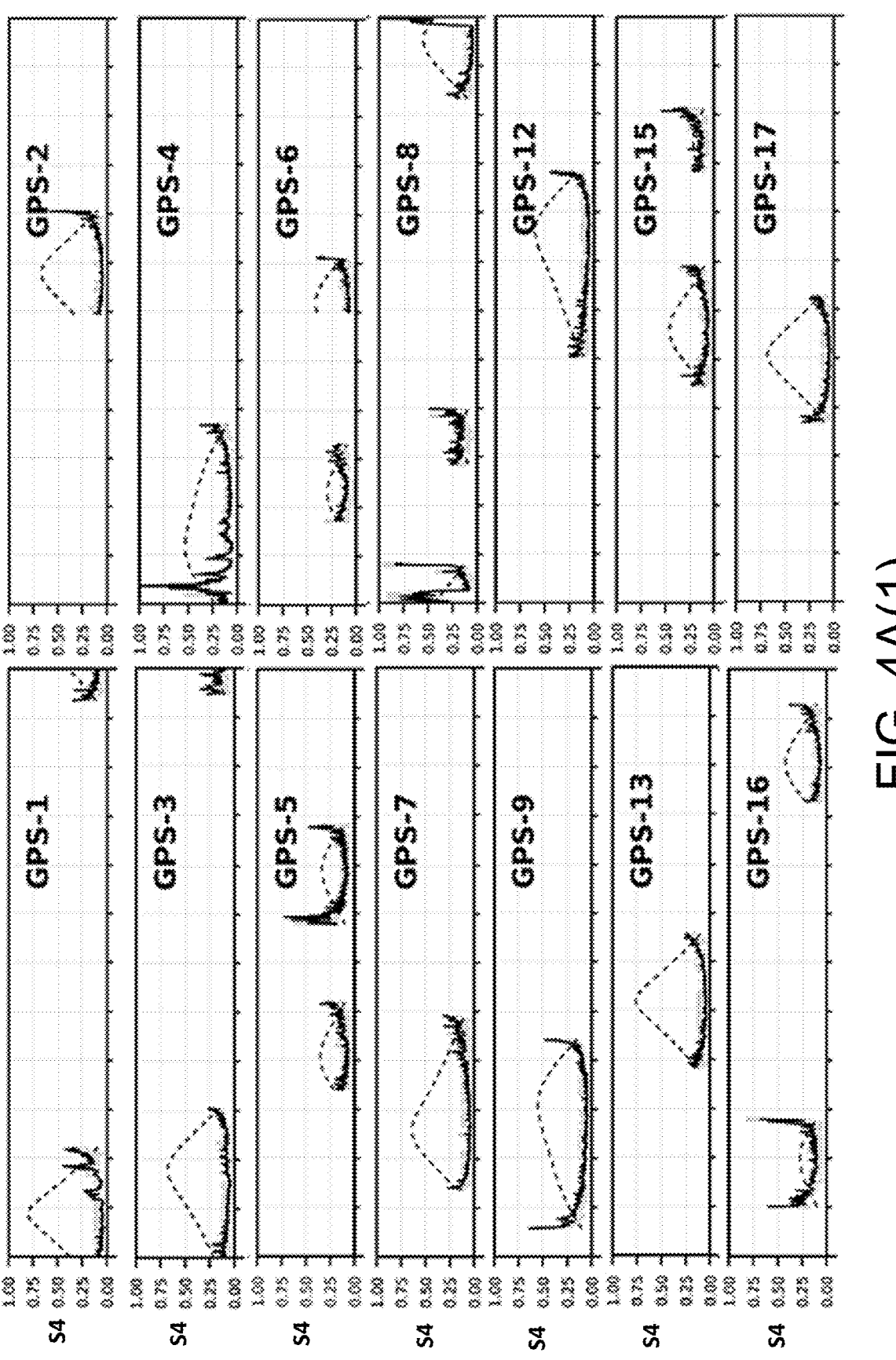
FIG. 4A(1)

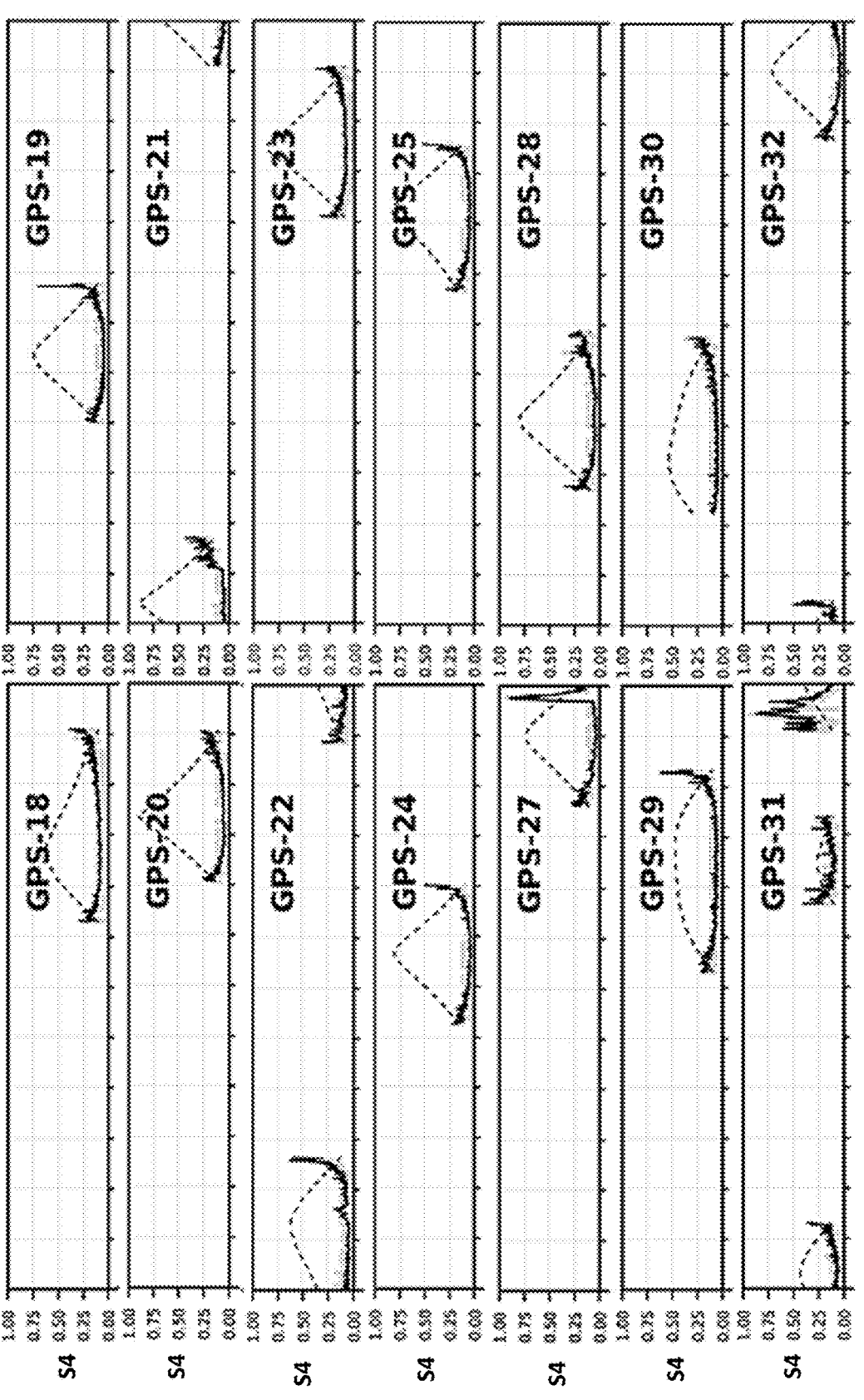
FIG. 4A(2)

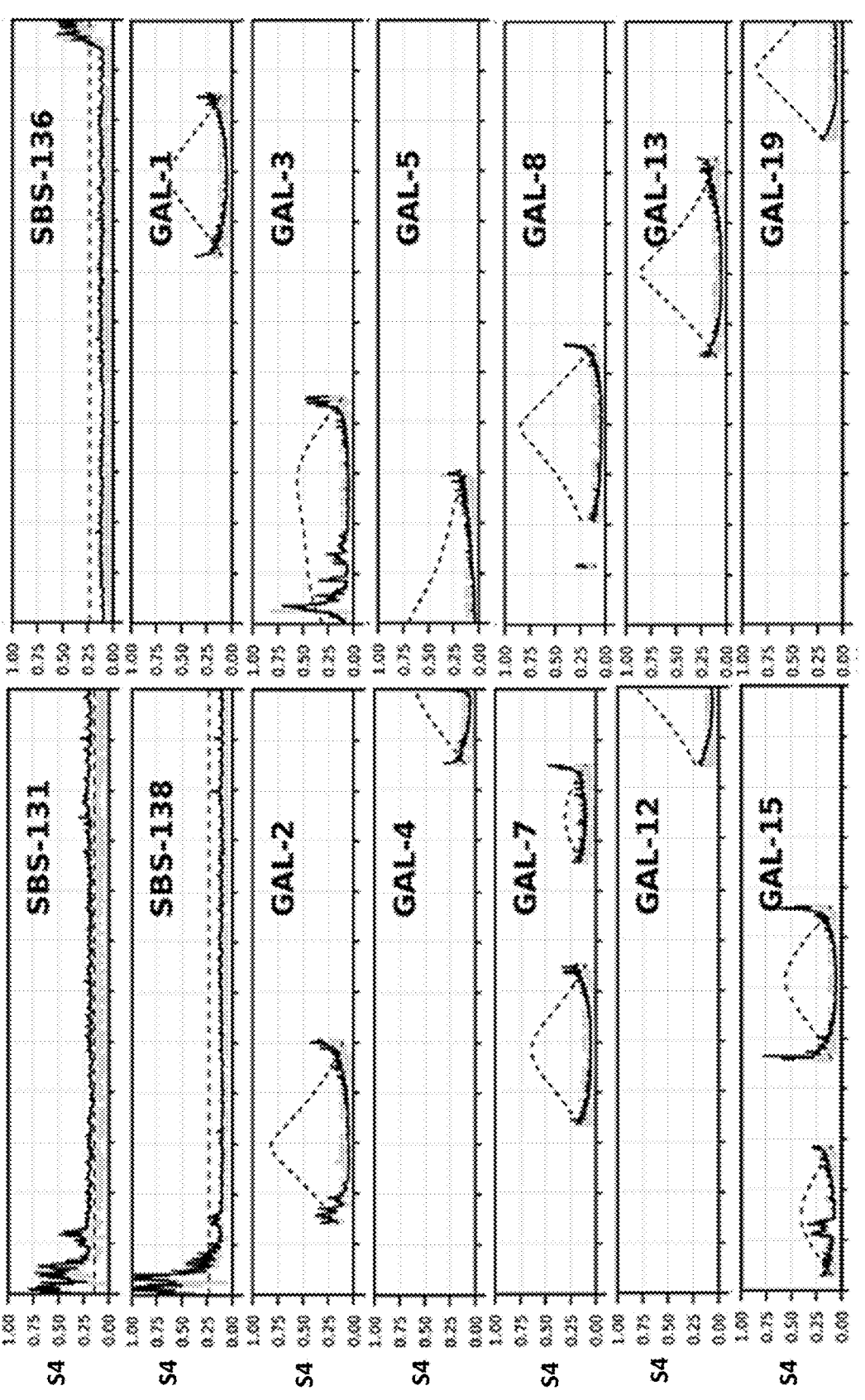
FIG. 4A(3)

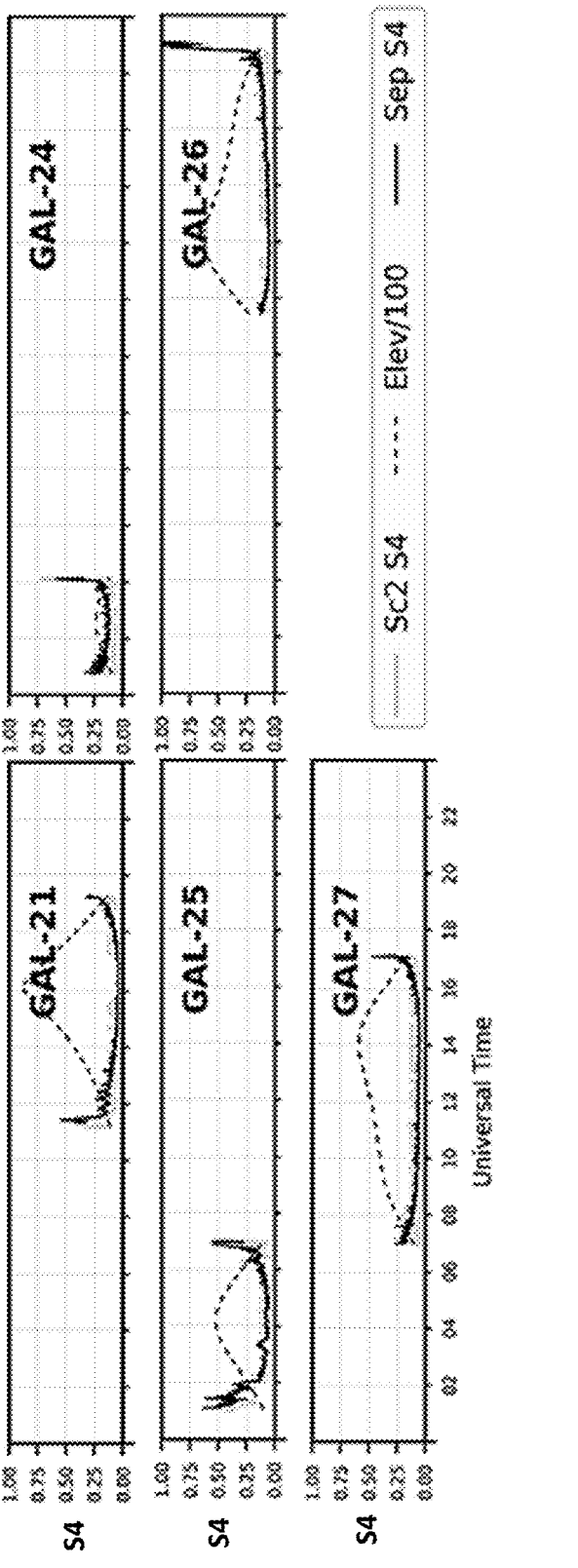
FIG. 4A(4)

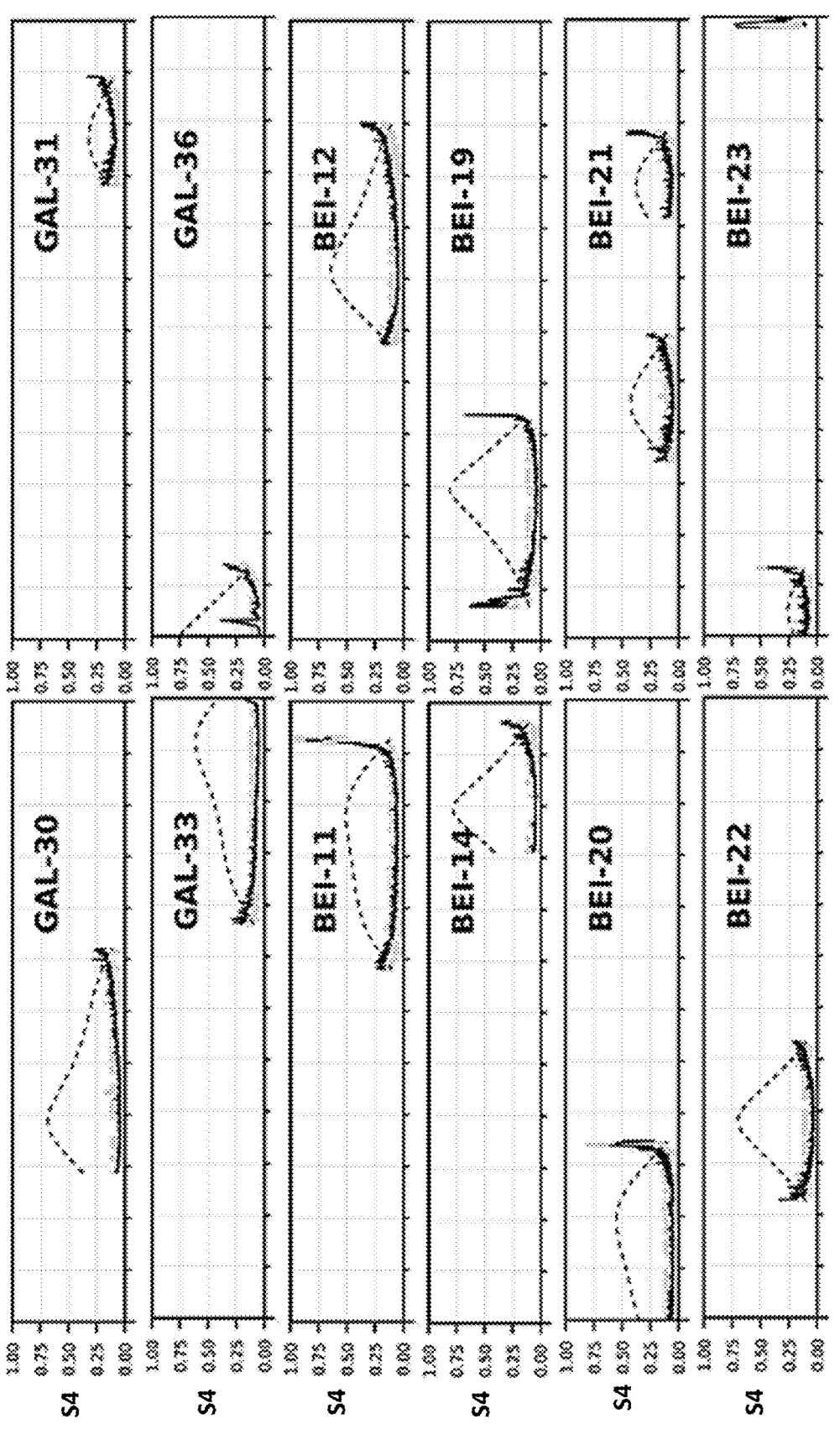
FIG. 4B(1)

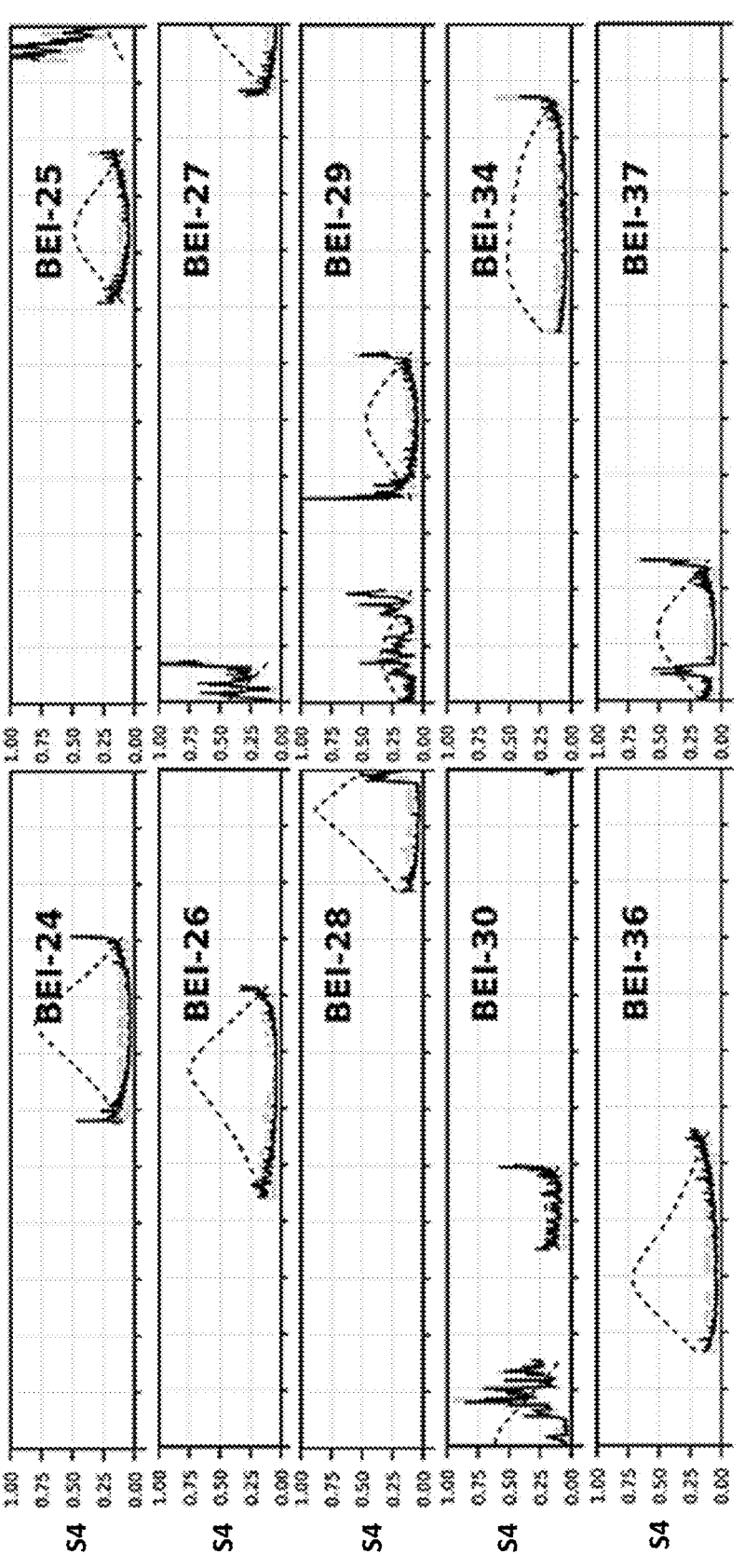
FIG. 4B(2)

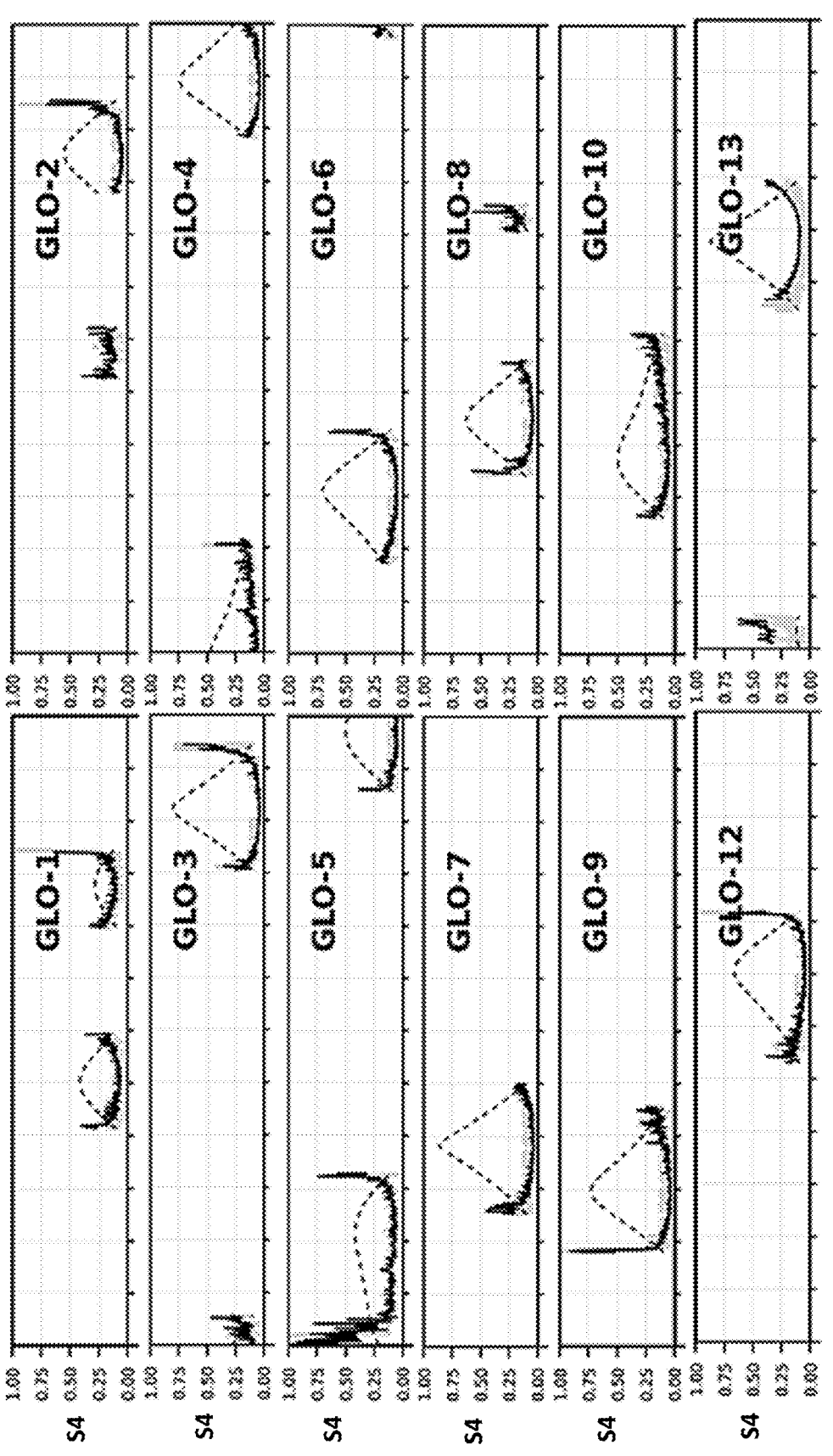
FIG. 4B(3)

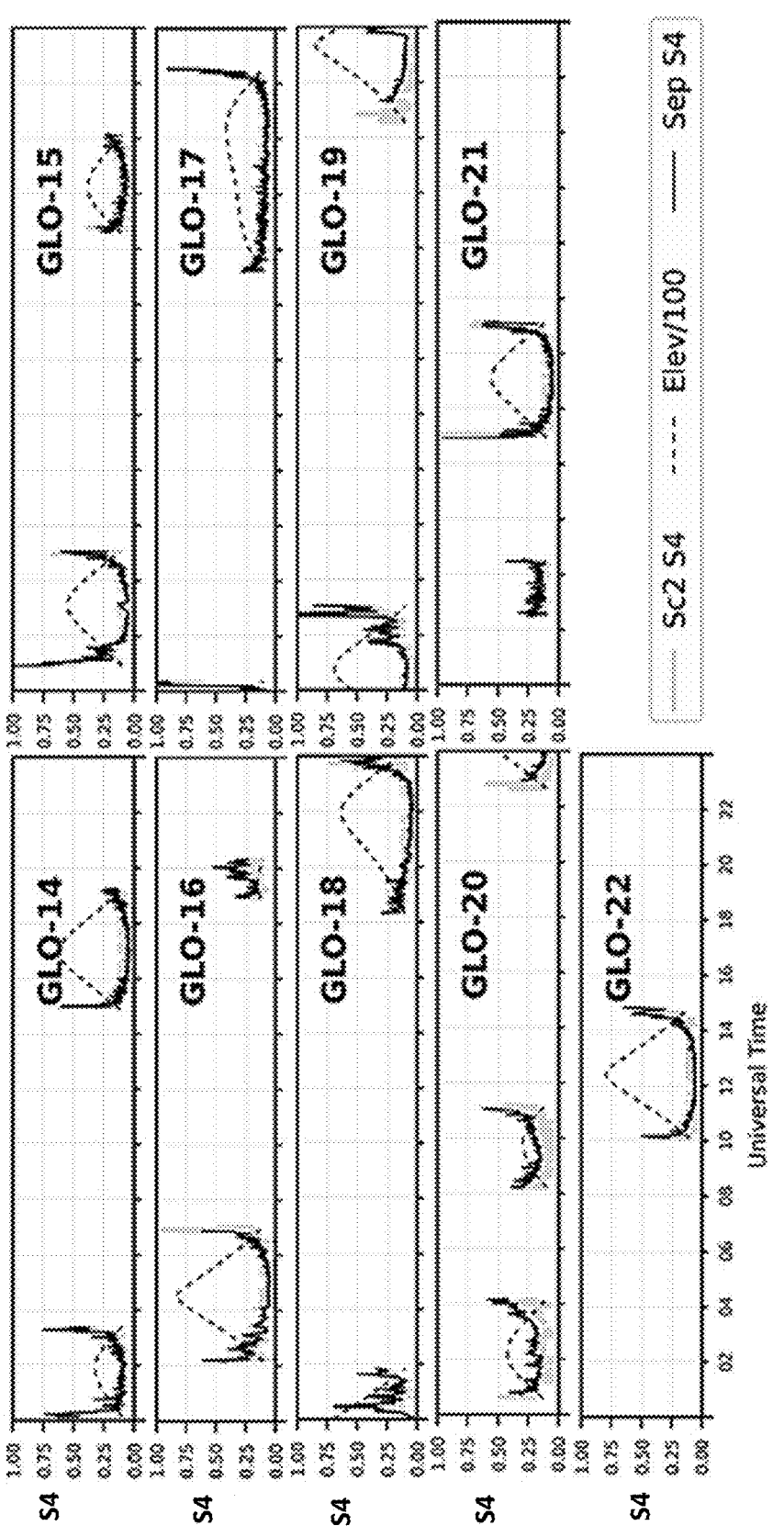
FIG. 4B(4)

IONOSPHERIC SCINTILLATION AND TOTAL ELECTRON CONTENT MONITORING SYSTEM

CROSS-REFERENCE TO RELATED APPLICATION

This application claims priority to co-pending U.S. provisional application entitled, "Ionospheric Scintillation and Total Electron Content Monitoring System," having application No. 63/349,656, filed Jun. 7, 2022, which is entirely incorporated herein by reference.

TECHNICAL FIELD

The present disclosure relates to a system and method for remote sensing of the ionosphere including scintillation and total electron content (TEC).

BACKGROUND

The Earth's ionosphere can be described as a region of the upper atmosphere between about 50 and 1,000 miles in altitude that is characterized by a density of free electrons that is high enough to affect the propagation of radio waves. These free electrons are produced, in most part, by solar photoionization.

Fluctuations in the ionospheric electron density caused by different types of physical processes affect radio signals propagating through the ionosphere. It causes, for instance, the diffraction of radio waves. Therefore, ionospheric fluctuations on the path of a transionospheric signal can cause the amplitude to fluctuate (or to scintillate). The ionosphere is also a birefringent medium meaning that signals with different frequencies travel at different speeds. That allows the use of two signals for the estimation of the total electron content (TEC) along a path between a signal transmitter and receiver.

BRIEF DESCRIPTION OF THE DRAWINGS

The novel features believed to be characteristic of the illustrative embodiments are set forth below. The illustrative embodiments, however, and further objectives and features thereof, will best be understood by reference to the following detailed description when read in conjunction with the accompanying drawings.

FIGS. 4A(1)-4A(4) and 4B(1)-4A(4) are a set of graphs showing a set of measured ionospheric scintillation indices (S4 values) from observations made by a ScintPi 2.0 receiver located in Presidente Prudente, Brazil (22.1° S, 51.24° W, 16.8° S dip latitude) and S4 values from a collocated commercial ionospheric scintillation and TEC monitor, Septentrio PolaRx5S.

DETAILED DESCRIPTION

Figure 1:
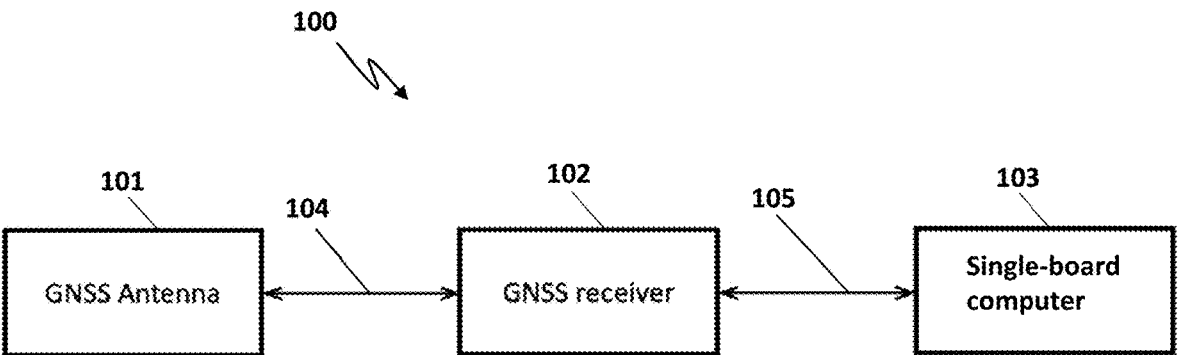
FIG. 1 is a block diagram of an exemplary ionosphere monitoring device in accordance with an illustrative embodiment of the present disclosure.

The present disclosure presents systems method for remote sensing of the ionosphere including scintillation and total electron content (TEC). While commercial global navigation satellite systems (GNSS)-based scintillation and TEC monitors already exist, systems and methods of the present disclosure utilize GNSS receiver(s), a single-board computer, and software that, together, can provide observations that are similar to those by commercial receivers but a fraction of the cost.

In general, measurements of ionospheric scintillation and TEC are important for advancing our basic understanding of physical processes in the space environment. These measurements are also important for advancing our understanding of the effects of the space environment on radio signals used in civilian and military applications.

While ionospheric effects can be detrimental to various applications, it also provides an opportunity for remote sensing techniques. Of particular interest here are refraction and diffraction effects. The frequency-dependent refractive index of the ionosphere allows, for instance, the use of multiple signals of different frequencies and coherently transmitted by satellites to be employed in deriving information about the ionosphere. The difference in delay of two signals is linearly related to the integral of the electron number density (in $m^{-3}$) along the signals' propagation path, which is commonly referred to as total electron content (TEC, in electrons/$m^2$). Additionally, ionospheric irregularities with scales around the Fresnel length contribute to scintillation. Therefore, scintillation can be utilized to monitor and study ionospheric irregularities.

Standard applications of global navigation satellite systems (GNSS) receivers include timing, navigation and positioning. A typical example of GNSS receiver is what we commonly refer to as GPS, which is short for Global Positioning System and it is a subset of GNSS. Instruments for monitoring ionospheric scintillation and TEC are based on measurements of signals transmitted by global navigation satellite systems but are made by specialized receivers, that is, by GNSS receivers capable of outputting ionospheric parameters, such as calculated position (e.g. coordinates) of the receiver, time, satellite identifier number, elevation, and azimuth of tracked satellites, signal intensities (SNR values), pseudo-phases, pseudo-ranges, and information about a quality of the GNSS signals.

Current instruments, however, are quite sophisticated and expensive (currently US$12,000 or more) causing difficulties for scientific applications. More specifically, scientific applications requiring the distributed deployment of various (~10s to 100s) of these instruments are of interest. The costs associated with setting up a distributed network of these ionosphere monitors, including deployment and maintenance make many scientific applications prohibitive. An improved ionosphere monitor that is easier to deploy, manage, and/or is more cost-effective is needed in the art.

The present disclosure teaches a method to reconfigure off-the-shelf GNSS receivers available for industrial applications (and are not designed to output ionospheric parameters) to create new, inexpensive GNSS-based ionospheric scintillation and TEC monitoring devices for scientific applications (that are newly configured to output ionospheric parameters). Inexpensive GNSS receivers exist today, but are only configured and useful for industrial applications such as positioning and navigation. In accordance with various embodiments of the present disclosure, an exemplary ionosphere monitoring device has been developed that uses a single-board computer configured with software specifically created for scientific data collection via GNSS receivers (e.g., off-the-shelf GNSS receivers that are not designed and preconfigured to output ionospheric parameters).

A goal of the present disclosure is to create an ionosphere monitoring system that is easy to deploy and operate, and whose cost is suitable for large scale deployment. An exemplary ionosphere monitoring device of the present disclosure can assist, for instance, studies that require a large number of spatially distributed ionospheric observations. Additionally, the simplicity of the system allows for ease of deployment, ease of operation and ease of use, such as for example, engagement of students in educational and research activities.

There has been a rapid increase in the variety of low-cost, off-the-shelf GNSS receivers available for industrial applications. The present disclosure shows for the first time how some of these low-cost receivers can be reconfigured for ionosphere measurement applications as well with surprisingly accurate results in comparison with a commercial ionospheric scintillation and TEC monitor, Septentrio PolaRx5S (Septentrio, 2021).

FIG. 1 is a schematic diagram of the overall hardware configuration for exemplary ionosphere monitoring devices (also referred to as ScintPi devices in the present disclosure). Each device 100 contains an external active GNSS antenna 101, GNSS receiver 102, and single-board computer 103 (e.g. Raspberry Pi or Arduino single-board computers) and connections. In various embodiments, GNSS antenna 101 is connected to GNSS receiver 102 through a cable connection 104, such as, but not limited to, a Radio-Frequency (RF) cable 104. The antenna 101 provides the GNSS signal to the GNSS receiver 102 over the cable connection 104. DC power is also provided by the receiver to the active antenna through the RF connection. GNSS receiver 102 is then connected to the single-board computer 103 via a data connection 105 (e.g., USB connection). The data connection 105 allows data from the receiver to be sent to the single-board computer. It also allows the single-board computer 103 to provide DC power to the GNSS receiver 102. In various embodiments, the GNSS receiver is capable of detecting at least a single frequency L-band signal (1.1-1.6 GHz) such as those used in standard GNSS systems.

In accordance with the present disclosure, different implementations of an exemplary ionosphere monitor 100 can be deployed. ScintPi 1.0 is an illustrative example of one such implementation. ScintPi 1.0 is based on the Adafruit Ultimate GPS peripheral (Adafruit Industries) integrated with a Raspberry Pi according to Rodrigues and Moraes (2019). Its development was intended for basic ionospheric research, education, and citizen science initiatives. Observations made by ScintPi 1.0 in parallel with a Septentrio PolaRx5S receiver allowed for determination of the strengths and weaknesses of the system. In particular, we found that the low sampling rate (10 Hz) and low resolution of SNR values (1 dB) output by the Adafruit GPS receiver did not affect the ability of the system to adequately detect ionospheric scintillation and determine the severity of the scintillation. On the other hand, we found that the Adafruit had a threshold in the SNR output at 52 dB. This meant that any values greater than 52 dB were output by the receiver as 52 dB. This truncation of the signal impacts the ability of the ScintPi 1.0 system to properly detect scintillation at high elevation angles when the signals could reach 52 dB which severely limits its application.

It is noted that ScintPi 1.0 uses a GPS-only receiver and in that exemplary implementation, a GPS antenna can be used instead of more expensive GNSS antenna. However, due to the limited application of ScintPi 1.0, because of signal truncation, additional implementation models have also been developed, including ScintPi 2.0 and ScintPi 3.0.

ScintPi 2.0 is an ionosphere monitor capable of measuring ionospheric scintillation using signals from multiple GNSS constellations such as GPS, GLONASS, GALILEO and BEIDOU. ScintPi 2.0 is based, for example, on a NEOM9 GNSS module (u-blox America, Inc) assisted by a single-board computer (Raspberry Pi).

The NEO-M9 series of concurrent GNSS modules is built on the high-performing u-blox M9 GNSS engine in the industry-proven NEO form factor. The NEO-M9N is optimized for cost-sensitive applications, while NEO-M9V and NEO-M9L provide the best performance. The future-proof NEO-M9N includes an internal flash that allows future firmware updates. This makes NEO-M9N perfectly suited to industrial and automotive applications (UBX-19027207-R05 NEO-M9N, 2021).

ScintPi 2.0 is capable of receiving signals from multiple GNSS satellites. More specifically, the NEO-M9 GNSS receiver is capable of tracking the following signals: GPS L1 C/A, QZSS L1 C/A/S, GLONASS L1OF, BeiDou B1I, Galileo E1B/C, and SBAS L1 C/A: WAAS, EGNOS, MSAS, GAGAN. Additionally, the ScintPi 2.0 can provide SNR values at rate as high as 25 Hz (using 4 concurrent GNSS modules supplied by the NEO-M9 GNSS receiver). While the Adafruit Ultimate GPS receiver provided SNR values at a rate of 10 Hz, the resolution of the SNR values supplied by the NEO-M9 GNSS receiver is the same as the Adafruit receiver, that is, 1 dB.

The following GNSS receiver specifications for the exemplary ScintPi 2.0 embodiment allow for adequate observations of ionospheric amplitude scintillation using single frequency detection in a GNSS receiver module by measuring a set of GNSS signal parameters as shown in Table 1 below. Thus, it is demonstrated that GNSS modules, such as the NEO-M9N can be used to adequately measure ionospheric amplitude scintillations.

TABLE 1

| | |
|---|---|
| Minimum sampling rate of SNR values* | 10 Hz |
| Minimum resolution of SNR values* | 1 dB |
| *for number of receiver frequencies in each GNSS module | 1 |

ScintPi 3.0 is an ionosphere monitor capable of measuring ionospheric scintillation and TEC using signals from multiple GNSS satellite constellations, including GPS, GLONASS, GALILEO and BEIDOU. ScintPi 3.0 is based, for example, on a ZED-F9P GNSS module (u-blox America, Inc) assisted by a single-board computer (Raspberry Pi). The ZED-F9P positioning module features the u-blox F9 receiver platform, which provides multi-band GNSS to high volume industrial applications (ZED-F9P, 2021).

ScintPi 3.0, as tested, was configured as a low-cost dual-frequency (~1.2 and ~1.6 GHz) GNSS-based ionospheric scintillation and TEC monitor. The ScintPi 3.0 ionosphere monitoring device provides SNR values with a resolution of 1 dB for two signals transmitted by each GNSS satellite being tracked. More specifically, it provides information for the following signals: GPS L1C/A and L2C, GLONASS L1OF and L2OF, GALILEO E1B/C and E5b, BEIDOU B1I and B2I, QZSS L1C/A as well as L1S and L2C. The ZED-F9P GNSS receiver can provide SNR values at a rate as high as 20 Hz depending on the number of GNSS satellite constellations being used. For the tests and results presented here, we tracked signals from GPS, GLONASS, GALILEO, and BEIDOU at a 10 Hz rate. The resolution of the SNR values is the same as ScintPi 1.0 and 2.0, that is, 1 dB. Finally, ZED-F9P as incorporated in the ScintPi 3.0 embodiment also provides phase and pseudo-range information for each signal which can be used to estimate the ionospheric TEC.

The following GNSS receiver specifications for the exemplary ScintPi 3.0 embodiment allow for adequate observations of ionospheric amplitude scintillation at two frequencies (for each GNSS) and for measuring ionospheric TEC by measuring a set of GNSS signal parameters as shown in Table 2 (below).

TABLE 2

| Minimum sampling rate of SNR values* | 10 Hz |
|---|---|
| Minimum resolution of SNR values* | 1 dB |
| Minimum sampling rate of carrier phase values* | 10 Hz |
| Minimum sampling rate of pseudo-range* | 10 Hz |
| *for number of receiver frequencies in each GNSS module | 2 or more |

In accordance with various embodiments of the present disclosure, the single board computer of an exemplary ionosphere monitoring device software is programmed or configured to read GNSS receiver messages and retrieve information that is of interest to ionospheric studies. This information, or parameters of interest, include calculated position (e.g., coordinates) of the receiver, time, satellite identifier number, elevation, and azimuth of tracked satellites, signal intensities (SNR values), pseudo-phases, pseudo-ranges, and information about a quality of the GNSS signals. For example, The u-blox GNSS receiver platform, as deployed in exemplary ScintPi embodiments, output data following a proprietary binary format called UBX, which groups the data into different UBX messages preceded by a timestamp. Thus, in various embodiments, the single board computer is configured to read the proprietary GNSS receiver messages and output relevant information into formatted data files, such that the data files can be stored and available for analysis by processing software of an external computer system which can analyze the parameters or measurements of interest and compute ionospheric scintillation indices (e.g., S4) and TEC.

In addition to envisioning easy deployment and remote automated operation, in various embodiments, software routines are developed to automate data/signal acquisition, organization, and transfer of data to a remote server and storage system. In certain embodiments, four (six) data files are created each day by ScintPi 2.0 (ScintPi 3.0). The files are compressed and uploaded once a day, by each ScintPi device, via internet to a storage system at UT Dallas. If internet is not available, files are then stored locally. In an exemplary server, data is organized by observation site.

Figure 2:
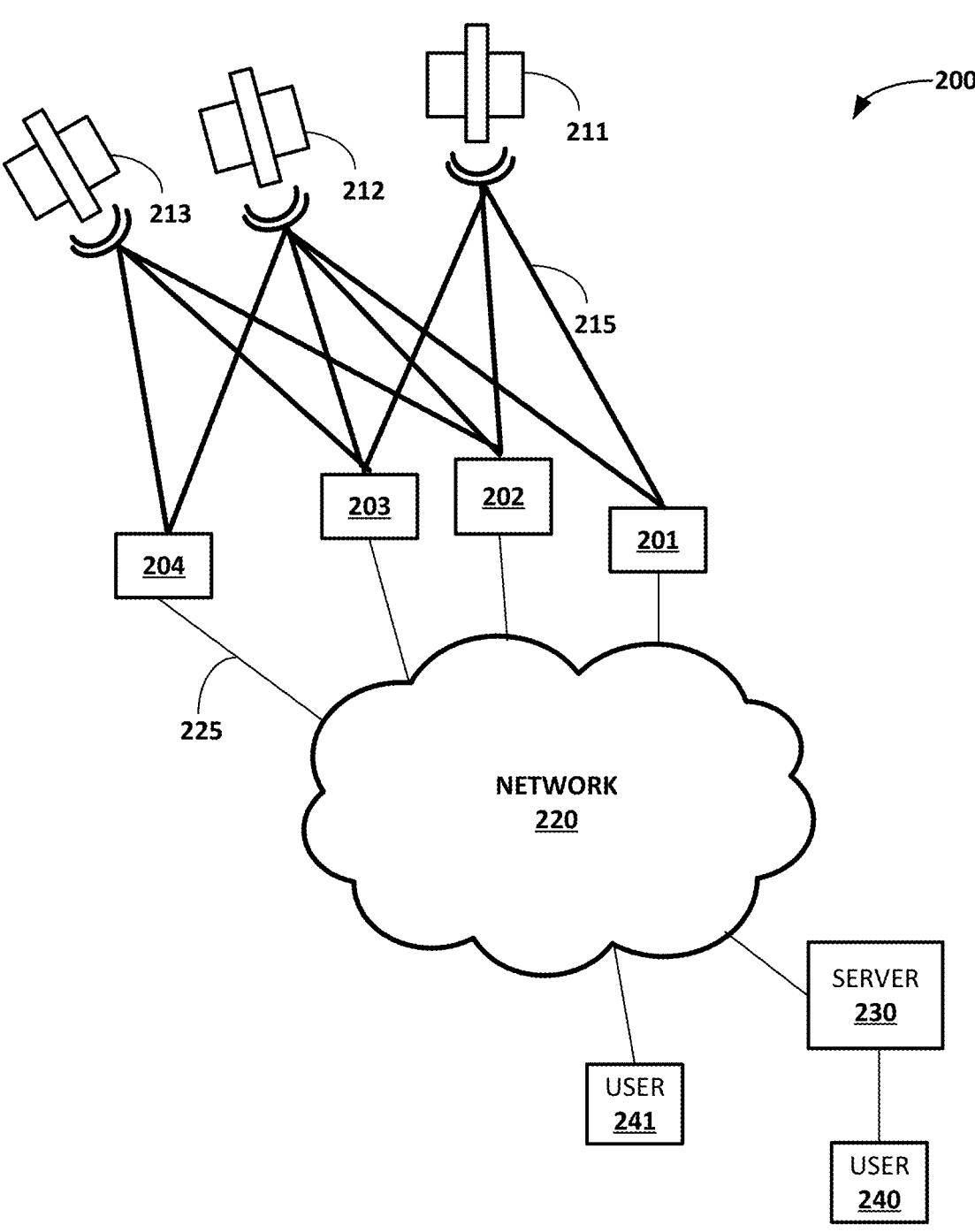
FIG. 2 is a schematic diagram of an ionosphere measuring system according to an embodiment of the present disclosure. The diagram shows a set of ionosphere monitoring devices in communication with a set of GNSS satellites to measure physical properties of a region of the ionosphere and in communication with a server for access by a set of users.

Turning now to FIG. 2, a schematic diagram of an ionosphere measuring system 200 is depicted in accordance with an illustrative embodiment. Ionosphere measuring system 200 may be implemented to create a large area map of ionosphere features in one or more regions of the ionosphere. In this illustrative example, ionosphere measuring system 200 includes communications network 220, which provides communications between ScintPi units 201, 202, 203, and 204 to a server 230 for data collection and archiving. A set of user devices 240 and 241 communicate with the server to further review and analyze measured ionosphere data. In some embodiments, a user device (e.g., user device 241) comprises a computing device that may communicate directly with the ScintPi units to download measured ionosphere data.

In various embodiments, each ScintPi unit is configured as an ionosphere monitoring device wherein each ScintPi unit contains a single board computer, a GNSS receiver and a GNSS antenna, as described in FIG. 1. Each ScintPi unit also includes memory, persistent storage devices, communications hardware capable of communicating to the server 230 via communication links 225. The GNSS antenna in each ScintPi unit is capable of detecting multiple RF GNSS signals 215 from a set of satellites 211, 212, and 213 and processing them through the GNSS receiver and single board computer for detailed measurements of the ionosphere in a region between the ScintPi unit and a subset of satellites 211, 212, and 213. The multiple RF GNSS signals may comprise signals at multiple frequencies in the L-band (1.1 GHz-1.6 GHz). In some embodiments, the multiple RF GNSS signals include two RF signals from each satellite wherein the two RF signals are at different frequencies. In various embodiments, each ScintPi unit is positioned in a different geographical position on or near the earth's surface so that a set of regions of the ionosphere may be measured and a map of ionospheric features created. In some embodiments, one or more of the ScintPi units may be affixed to a position on the earth's surface, may be situated in an aircraft while in flight (such as an airplane or a balloon), may be in orbit above the earth's surface (e.g., in a satellite), or a combination thereof in order to create a detailed map of ionospheric features in one or more regions of the ionosphere.

Figure 3:
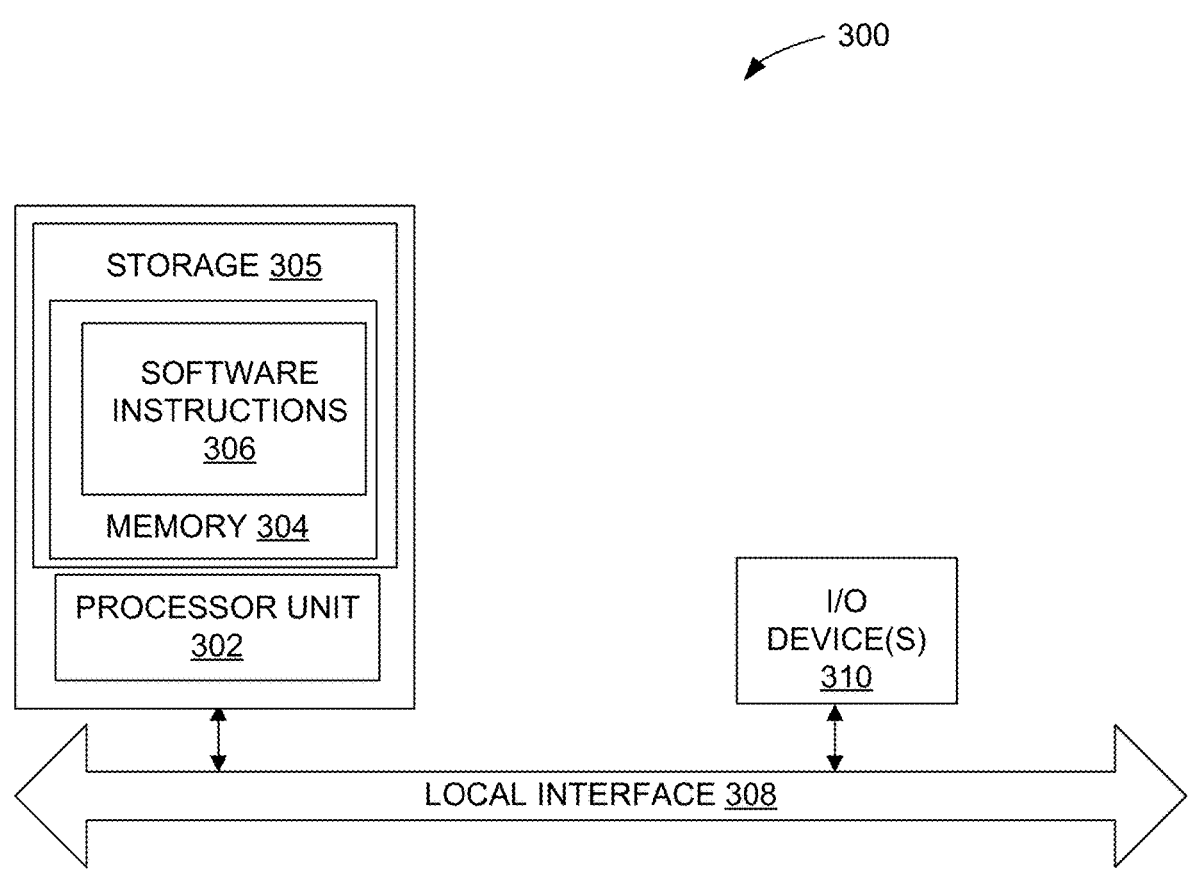
FIG. 3 shows a schematic block diagram of a computing device that can be used to implement various embodiments of the present disclosure.

Next, FIG. 3 depicts a schematic block diagram of a ionosphere monitoring device 300 that can be used to implement various embodiments of the present disclosure. An exemplary monitoring device 300 includes a processor unit 302. The processor unit 302 on each single board computer of each ScintPi unit serves to execute programmatic instructions for software 306 that may be loaded into its memory 304. Processor unit 302 may be a number of processors, a multi-processor core, or some other type of processor, depending on the particular implementation.

Memory 304 and persistent storage are examples of storage devices 305. A storage device 305 is any piece of hardware that is capable of storing information, such as, for example, without limitation, at least one of data, program code in functional form, or other suitable information either on a temporary basis, a permanent basis, or both on a temporary basis and a permanent basis. Storage devices may also be referred to as computer-readable storage devices in these illustrative examples. Memory 304, in these examples, may be, for example, a random-access memory or any other suitable volatile or non-volatile storage device. Persistent storage may take various forms, depending on the particular implementation.

For example, persistent storage may contain one or more components or devices. For example, persistent storage may be a hard drive, a solid-state drive (SSD), a flash memory, a rewritable optical disk, a rewritable magnetic tape, or some combination of the above. The media used by persistent storage also may be removable. For example, a removable hard drive may be used for persistent storage.

Communications capability, in these illustrative examples, provides for communications with other data processing systems such as server 230 or with other ScintPi units to form a network of ScintPi units. In these illustrative examples, communications capability includes wired and wireless internet, but other forms of communications may be conceived. Accordingly, for an exemplary ionosphere monitoring device 300, at least one processor unit and a memory 304 are coupled to a local interface 308, and one or more input and output (I/O) devices 310, such as GNSS receiver 102. The local interface 308 may comprise, for example, a data bus with an accompanying address/control bus or other bus structure as can be appreciated.

Instructions 306 for at least one of an operating system, applications, or programs may be located in storage devices 305, which are in communication with a processor of a ScintPi unit through on-board communications. The processes of the different embodiments may be performed by the processor 302 of the single-board computer using computer-implemented instructions, which may be located in the memory 304.

These instructions 306 are referred to as program code, computer usable program code, or computer-readable program code that may be read and executed by a processor in processor unit 302. The program code in the different embodiments may be embodied on different physical or computer-readable storage media, such as memory or persistent storage.

Alternatively, program code may be transferred to and from server 230 using a computer-readable signal media. The computer-readable signal media may be, for example, a propagated data signal containing the program code. For example, the computer-readable signal media may be at least one of an electromagnetic signal, an optical signal, or any other suitable type of signal. These signals may be transmitted over at least one of communications links 225, such as wireless communications links, optical fiber cable, coaxial cable, a wire, or any other suitable type of communications link.

In an embodiment of the present disclosure, the software instructions 306 or program code (e.g., acquisition software) in computer code which is capable of acquiring, from the GNSS receiver, the set of GNSS signal parameters to determine physical properties of the ionosphere; operating on a ScintPi unit 100 reconfigures the purpose and function of the GNSS receiver 102 from its intended industrial use (positioning and navigation) to a new purpose of acquiring and measuring specific physical properties of the region of the ionosphere between the GNSS receiver 102 and a set of satellites 211-213—a capability and function which was never conceived by the original manufacturer of the GNSS receiver 102 or the single-board computer 103.

The different components illustrated for ionosphere measuring system 200 are not meant to provide architectural limitations to the manner in which different embodiments may be implemented. The different illustrative embodiments may be implemented in a scientific data processing system including components in addition to or in place of those illustrated for ionospheric measuring system 200. Other components shown in FIG. 2 can be varied from the illustrative examples shown.

Next, we present and discuss examples of observation results obtained with ScintPi 2.0 and ScintPi 3.0. In these examples, parallel measurements made with the ScintPi units and Septentrio PolaRx5S are presented. By parallel measurements, we mean that the signal collected by a GNSS antenna was split in two signals and sent to the Septentrio and ScintPi receiver. This allows one to compare the ScintPi measurements with Septentrio measurements given by the same signal.

In order to evaluate routine operations and the ability of ScintPi 2.0 to make adequate measurements of ionospheric amplitude scintillations, the system is deployed in Presidente Prudente, Brazil (22.1°S, 51.24° W, 16.8° S dip latitude). The site is near the nominal location of the equatorial anomaly peak where amplitude scintillation events with a wide range of intensities are expected to occur. These events are associated with equatorial spread F-ESF (e.g., Woodman, 2009). FIGS. 4A(1)-4A(4) and FIGS. 4B(1)-4B(4) show an example of the observations made on Nov. 3, 2020. In particular, it shows a summary of ScintPi 2.0 S4 values (grey curves) for all the satellites tracked throughout the day and above 20° elevation. The S4 value is a scintillation index commonly used in ionospheric studies. S4 can be defined as the standard deviation of signal intensity normalized by its average (e.g., Kintner et al., 2007). Signal intensities are estimated from the SNR values provided by the u-blox receivers. FIGS. 4A(1)-4A(4) and FIGS. 4B(1)-4B(4) serve to show that ScintPi 2.0 can track ~100 different satellites on a given day including (for the Brazilian location) signals from 3 geostationary satellites, which provide continuous observations at fixed ionospheric piercing points (IPPs). Since ScintPi 2.0 was deployed in parallel with a Septentrio PolaRx5S, the S4 values can be compared with one another.

FIGS. 4A(1)-4A(4) and FIGS. 4B(1)-4B(4) also show the S4 values measured by the Septentrio monitor (black curves). Dashed curves indicate the elevation (divided by 100) of the satellites. Inspection of the data in FIGS. 4A(1)-4A(4) and FIGS. 4B(1)-4B(4) show that ScintPi 2.0 is capable of detecting scintillation events associated with ESF. This is more clearly observed in the S4 values for the SBAS 131,136 and 138 signals. Increases in S4 can be clearly seen between 0000 UT and 0600 UT. This is the time of ESF occurrence. More importantly is the fact that the S4 values from ScintPi 2.0 follow closely to S4 values from the Septentrio monitor. While this was expected from the results with ScintPi 1.0 (Rodrigues and Moraes, 2019), it reinforces the ability of low-cost receivers such as those presented here to produce surprisingly excellent estimates of scintillation severity.

Figure 5:
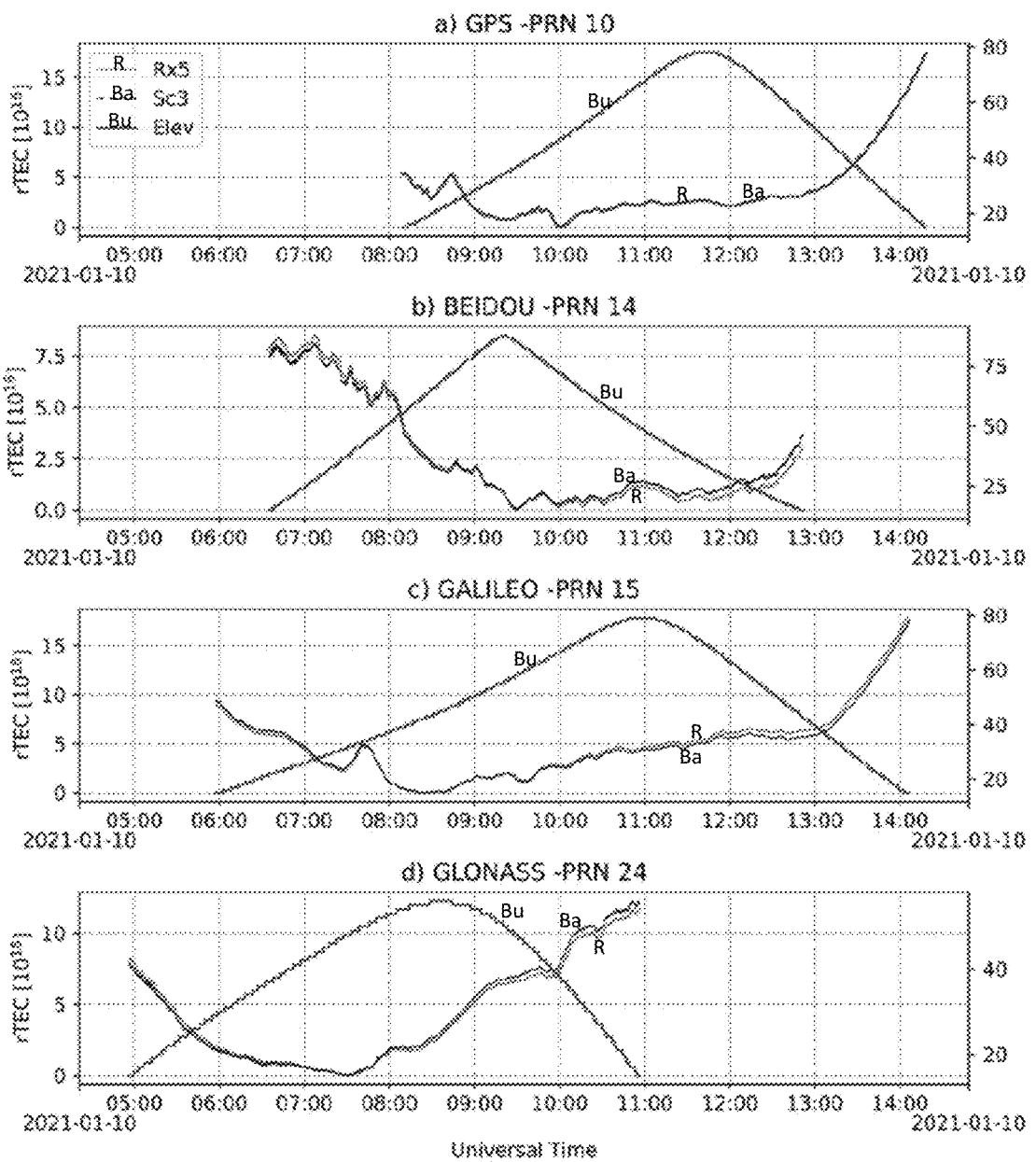
FIG. 5 is a set of graphs showing measured ionospheric TEC from observations made by a ScintPi 3.0 monitor and TEC from a collocated Septentrio PolaRx5S monitor.

FIG. 5 now shows examples of the relative (phase-derived) ionospheric TEC estimates provided by ScintPi 3.0. In particular, it shows examples of TEC derived of signals from 4 different constellations. The observations were made on Jan. 10, 2021 in a lab at UT Dallas (32.99° N, 96.76° W, 43.2° N dip latitude). Again, the observations were made in parallel with measurements made by a Septentrio PolaRx5S receiver for comparison purposes. ScintPi TEC values are shown as red curves, which are denoted with an "R" in the black and white figures used for this patent application, while Septentrio TEC values are shown as dashed-black curves, which are denoted with a "Ba" in the black and white figures used for this patent application. Blue curves, which are denoted with a "Bu" in the black and white figures used for this patent application, indicate the elevation (axis on the right) of the satellites.

Accordingly, FIG. 5 serves to show that ScintPi 3.0 is capable of providing estimates of TEC that follow very closely to those provided by Septentrio. In FIG. 5, examples of relative TEC (rTEC) measurements made by the system for different GNSS signals are shown, in which selected examples show that even variations with very small amplitudes (~0.1 TECU, 1 TECU=1×10$^{16}$ electrons/m$^2$) are captured by ScintPi 3.0. The relative TEC (rTEC) values are obtained from differential phase measurements. That is, the relative TEC is proportional to the difference between the phase measured for an L1 GPS signal and phase measured for an L2 GPS signal. Additionally, in various embodiments, an ionosphere monitoring device can also measure absolute TEC, where the absolute TEC is derived from differences in the pseudo-ranges measured using L1 and L2 GPS signals. In accordance with embodiments of the present disclosure, the ability of deriving TEC values that is sufficient for scientific applications using off-the-shelf GNSS receivers is new and inventive.

Figure 6:
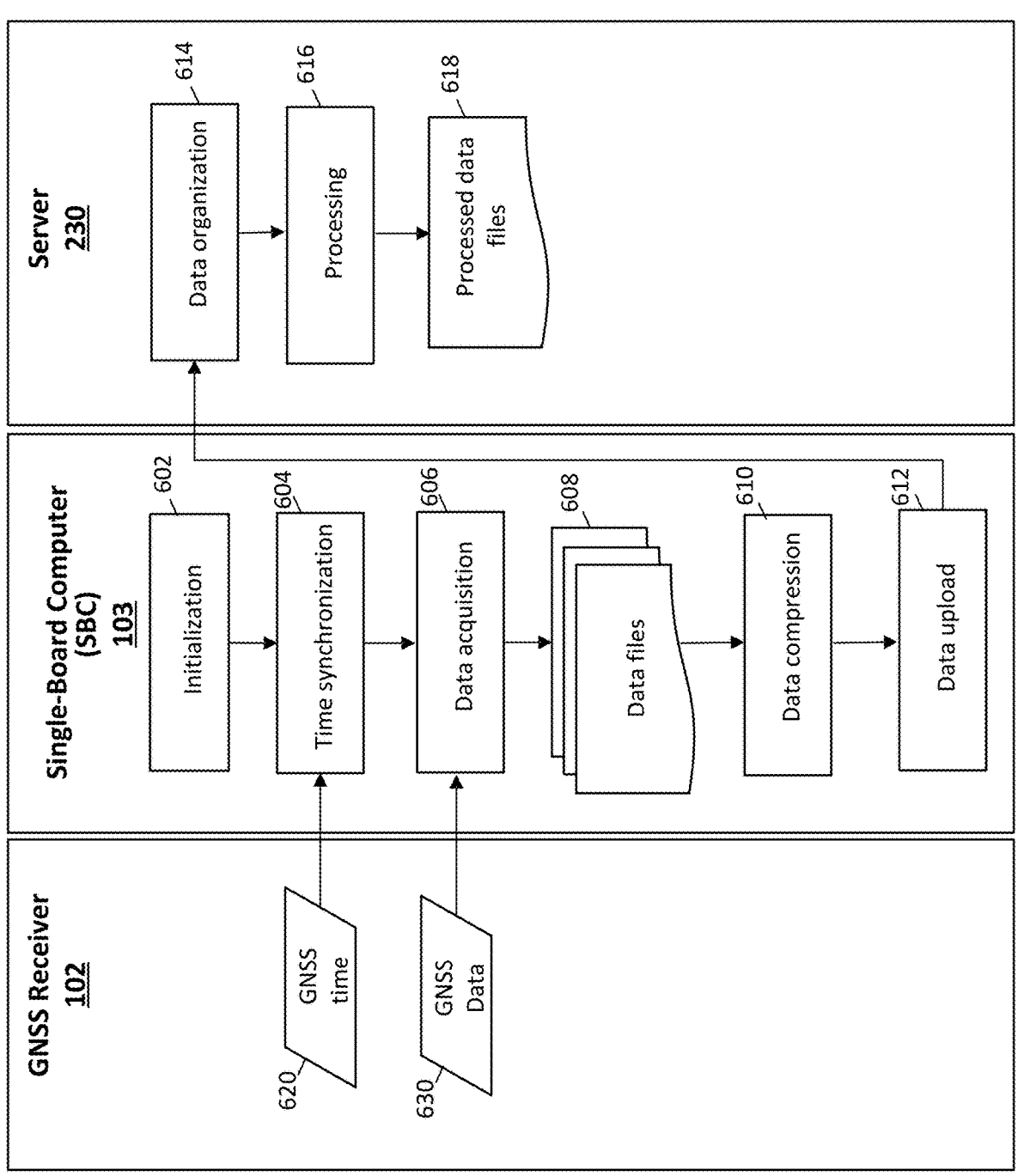
FIG. 6 is a series of flowcharts showing exemplary functionality of the ionosphere monitoring device of FIG. 1 in accordance with various embodiments of the present disclosure.

Referring now to FIG. 6, a diagram of a series of flowcharts is provided that depict functionality of the ionosphere monitoring device 100 of FIG. 1 in accordance with various embodiments of the present disclosure. At the single-board computer 103, initialization (602) is performed by powering on the ionosphere monitoring device 100, setting up communication parameters, and checking the single-board computer's interface with the GNSS receiver 102. Next, the single-board computer 103 undergoes time synchronization (604) in which the local time of the single-board computer 103 is synchronized with the local time 620 of the GNSS receiver 102. Then, the single-board computer 103 initiates data/signal acquisition (606) and the collection of data 630 output by the GNSS receiver 102. After which, relevant data is retrieved from data packets, organized, and placed into data files 608. The data files are compressed (610) periodically by the single-board computer 103 and data files are uploaded (612) to a remote or central server 230 when a network connection is available.

At the remote server 230, data organization (614) is performed in which the data files are received from the ionosphere monitoring device 100 and the data is uncompressed & organized in group folders. The information provided in the data files is processed (616) and new files with data products (e.g., ionospheric scintillation indices such as S4 and TEC) are computed. As such, daily data files with data products are processed and generated (618).

The descriptions of the various embodiments of the present disclosure have been presented for purposes of illustration, but are not intended to be exhaustive or limited to the embodiments disclosed or claimed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The invention claimed is:

1. An ionosphere measuring system comprising:
an ionosphere monitoring device comprising a global navigation satellite systems (GNSS) receiver, a GNSS antenna, a single-board computer, and software for signal acquisition and processing;
the GNSS receiver electrically connected to the GNSS antenna for receiving radio frequency (RF) signals from a set of GNSS satellites; and
the single-board computer operating a set of programmatic instructions and communicatively connected to the GNSS receiver;

wherein the single-board computer is further configured to:
extract a set of specific parameters from the GNSS receiver; and,
determine physical properties of an ionosphere from the set of specific parameters,
wherein the GNSS receiver has a minimum sampling rate of the set of specific parameters of 10 Hz for at least two different RF frequencies and a minimum resolution of SNR values for at least two different RF frequencies of 1 dB.

2. The system of claim 1 wherein the set of specific parameters from the GNSS receiver comprises information about positioning of GNSS satellites, receiver coordinates, information about a quality of GNSS signals, signal intensities, pseudo-ranges, pseudo-phases, or a combination thereof.

3. The system of claim 1 wherein the physical properties of the ionosphere comprise ionospheric scintillation.

4. The system of claim 1 wherein the physical properties of the ionosphere comprise total electron content (TEC).

5. The system of claim 1, wherein the GNSS receiver is originally configured to measure only global positioning system coordinates and wherein the GNSS receiver is reconfigured by the set of programmatic instructions to extract the set of specific parameters from the GNSS receiver to determine the physical properties of the ionosphere.

6. The system of claim 1, wherein the GNSS receiver has a minimum sampling rate of carrier phase values of 10 Hz for at least two different RF frequencies.

7. The system of claim 1, wherein the GNSS receiver has a minimum sampling rate of pseudo-range values of 10 Hz for at least two different RF frequencies.

8. The system of claim 1, wherein the GNSS receiver has a minimum sampling rate of SNR values of 10 Hz for at least two different RF frequencies.

9. The system of claim 1, wherein the at least two different RF frequencies are in a range of 1.1 GHz to 1.6 GHz.

10. The system of claim 1, further comprising:
a set of geographically dispersed ionosphere monitoring devices that is configured to observe and receive signals from several sets of GNSS satellites, wherein the set of geographically dispersed ionosphere monitoring devices comprises a plurality of the ionosphere monitoring devices;
a server communicating to the set of geographically dispersed ionosphere monitoring devices;
wherein the server is configured to collect the determined physical properties of the ionosphere from the set of ionosphere monitoring devices and create a geophysical spatial distribution of the determined physical properties of the ionosphere,
wherein the ionosphere monitoring devices are configured to measure SNR signal values of 52 dB or greater.

11. The system of claim 1, wherein the GNSS receiver comprises a u-blox model NEO-M9N GNSS receiver or a u-blox model ZED-F9P GNSS receiver, wherein the single-board computer comprises a Raspberry Pi single-board computer or an Arduino single-board computer.

12. A method for measuring physical properties of an ionosphere comprising the steps of:
providing a single-board computer communicatively connected to a global navigation satellite systems (GNSS) receiver which is preconfigured to determine global positioning system coordinates by communicating with a set of GNSS satellites, reconfiguring a function of the single-board computer and GNSS receiver to acquire a set of GNSS signal parameters; and determining the set of physical properties of an ionosphere from the set of GNSS signal parameters, wherein the reconfiguration comprises:

implementing acquisition software in computer code which is capable of acquiring, from the GNSS receiver, the set of GNSS signal parameters to determine physical properties of the ionosphere;

operating the acquisition software uninterruptedly in the single-board computer; and implementing acquisition of the set of GNSS signal parameters at a sampling rate of at least 10 Hz.

13. The method of claim 12, wherein the set of physical properties of the ionosphere comprise ionospheric scintillation.

14. The method of claim 12, wherein the set of physical properties of the ionosphere comprise total electron content of the ionosphere.

15. The method of claim 12, wherein the reconfiguration further comprises acquiring the set of GNSS signal parameters for at least two RF frequencies.

16. The method of claim 12, further comprising:

deploying a set of reconfigured single-board computers and GNSS receivers;

communicatively connecting the set of reconfigured single-board computers and GNSS receivers to at least one server;

measuring the set of GNSS signal parameters for GNSS signals across a region of the ionosphere;

sending the measured set of GNSS signal parameters to at least one server; and deriving physical properties of the ionosphere from the measured set of GNSS signal parameters.

17. The method of claim 16, wherein the at least one server is configured to create a spatial distribution of the physical properties of the region of the ionosphere, wherein the set of reconfigured single-board computers and GNSS receivers is placed on multiple continents of the earth's surface, wherein the placement of the set of reconfigured single board computers and GNSS receivers comprise at least two of:

on a surface of a continent;

above the surface of a continent;

on the surface of an ocean;

above the surface of an ocean; or in flight above the earth's surface.

* * * * *